(12) United States Patent
Brinkhoff et al.

(10) Patent No.: US 9,300,352 B2
(45) Date of Patent: Mar. 29, 2016

(54) TRANSCEIVER WITH BOARD-LEVEL CONFIGURATION OF ON-CHIP OR EXTERNAL TRANSMIT/RECEIVE SWITCH

(71) Applicant: BROADCOM CORPORATION, Irvine, CA (US)

(72) Inventors: James Brinkhoff, Meadowbank (AU); Andrew Adams, Stanmore (AU)

(73) Assignee: BROADCOM CORPORATION, Irvine, CA (US)

( * ) Notice: Subject to any disclaimer, the term of this patent is extended or adjusted under 35 U.S.C. 154(b) by 452 days.

(21) Appl. No.: 13/769,727

(22) Filed: Feb. 18, 2013

(65) Prior Publication Data

US 2014/0213200 A1    Jul. 31, 2014

Related U.S. Application Data

(60) Provisional application No. 61/758,626, filed on Jan. 30, 2013.

(51) Int. Cl.
*H04B 1/44* (2006.01)
*H04B 1/48* (2006.01)

(52) U.S. Cl.
CPC ..................... *H04B 1/48* (2013.01)

(58) Field of Classification Search
CPC ............ H04B 1/48; H04B 1/006; H04B 1/40; H04B 1/0458; H04B 1/18; H04B 1/005; H04B 1/406; H04B 2001/0491; H04B 5/0075; H04B 1/034; H04B 7/0805
USPC .............................................. 455/83
See application file for complete search history.

(56) References Cited

U.S. PATENT DOCUMENTS

| | | | |
|---|---|---|---|
| 2005/0176380 A1* | 8/2005 | Okabe ..................... | H04B 1/38 455/73 |
| 2006/0135084 A1* | 6/2006 | Lee .......................... | H04B 1/18 455/78 |
| 2011/0143690 A1* | 6/2011 | Jerng ....................... | H04B 1/44 455/78 |
| 2013/0105951 A1* | 5/2013 | Popovich ............. | H01L 27/0251 257/659 |

* cited by examiner

*Primary Examiner* — Ajibola Akinyemi
(74) *Attorney, Agent, or Firm* — Garlick & Markison; Randy Lacasse

(57) ABSTRACT

A transceiver includes an integrated circuit that enables board-level configuration of an on-chip or external transmit/receive switch. The transceiver uses a high-Q matching network, at least part of which is external, that improves receiver performance; increases transmit power while allowing for configuration of the same chip to use an internal TR switch, or external TR switch by changing connection at the board level rather than the chip level.

20 Claims, 7 Drawing Sheets

TRANSCEIVER WITH BOARD-LEVEL CONFIGURATION OF ON-CHIP OR EXTERNAL TRANSMIT/RECEIVE SWITCH

CROSS-REFERENCE TO RELATED APPLICATIONS/INCORPORATION BY REFERENCE

The present U.S. Utility Patent Application claims priority pursuant to 35 U.S.C. §119(e) to U.S. Provisional Patent Application Ser. No. 61/758,626 entitled, "Transceiver with Board-Level Configuration of On-Chip or External Transmit/Receive Switch," (Attorney Docket No. BP31387), filed Jan. 30, 2013, pending, which is hereby incorporated herein by reference in its entirety and made part of the present U.S. Utility Patent Application for all purposes.

BACKGROUND OF THE INVENTION

1. Technical Field of the Invention

The technology described herein relates generally to wireless communications and more particularly to circuits used to support wireless communications.

2. Description of Related Art

Communication systems are known to support wireless and wireline communications between wireless and/or wireline communication devices. Such communication systems range from national and/or international cellular telephone systems to the Internet to point-to-point in-home wireless networks to radio frequency identification (RFID) systems. Each type of communication system is constructed, and hence operates, in accordance with one or more communication standards. For instance, wireless communication systems may operate in accordance with one or more standards including, but not limited to, 3GPP, LTE, LTE Advanced, RFID, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to one or more antennas (e.g., MIMO) and may include one or more low noise amplifiers, one or more intermediate frequency stages, a filtering stage, and a data recovery stage. The low noise amplifier(s) receives inbound RF signals via the antenna and amplifies them. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

Currently, wireless communications occur within licensed or unlicensed frequency spectrums. For example, wireless local area network (WLAN) communications occur within the unlicensed Industrial, Scientific, and Medical (ISM) frequency spectrum of 900 MHz, 2.4 GHz, and 5 GHz.

Wireless transceivers implemented using integrated circuits (ICs) are designed to meet specific noise requirements. Two distinct versions of such transceivers are often manufactured, one with an internal transmitter/receiver (TR) switch and one designed to use an external TR switch. The latter version achieves better transmit and receive performance due to superiority of discrete external TR switches compared with integrated TR switches. As a result, a cost sensitive customer may opt for an integrated TR switch version, and a performance sensitive customer may choose an external TR switch version. Producing two versions increases mask costs and design verification time. In addition, it is known that transceivers with integrated TR switches suffer from degraded transmit and receive performance. The former is related to the additional load of the receiver, dissipating some of the transmit power. The latter is related to the additional load of the transmitter and TR switch, increasing the noise to the receiver.

Typically, two different versions of a transceiver IC are required in order to support an internal TR switch and external TR switch. Integrated inductors for these versions may need to be of different sizes in order to tune out differing amounts of capacitances present in the respective versions. The internal TR switch version may require additional resonating capacitance to correctly set the resonant frequency of the receive path during transmit mode. In addition, an external TR switch version may omit the TX series switch, in order to minimize transmit power losses.

FIG. 1 illustrates one example of a transceiver integrated circuit having an external TR switch where transceiver 100 includes transceiver IC 101, antenna 102 and external TR switch 103. Transceiver IC 101 transmits signals via transmitter 104 in connection with power amplifier (PA) 105 through output port 106. External transmit/receive (TR) switch 103, in transmit (TX mode), provides a connection between output port 106 and antenna 102 for signal transmission. During receive (RX) mode, signals are received through antenna 102 passing through external switch 103 and, in some configurations, through first low-noise amplifier (LNA) 107 and transceiver IC 101 via input port 108. Signals pass from input port 108 through integrated gate inductor 109 and second LNA 110 and ultimately receiver 111.

FIG. 2 illustrates one of many possible implementations for internal TR switches. Transceiver 200 includes antenna 201 connected to transceiver IC 202 via input/output port 203. Signals are transmitted from transceiver IC 202 to antenna 201 through transmitter 204 in connection with PA 205. PA 205 provides an amplified signal to TX series switch 206. In TX mode, TX series switch 206 is ON allowing amplified signals to pass through input/output port 203 to antenna 201. In addition, RX shunt switch 207 is ON (forming a low impedance path to ground). Internal gate inductor 208 resonates with the shunt capacitance in order that the receive path presents a high impedance to transmitter 204, thus minimizing power loss in that path. The size of RX shunt switch 207 is made sufficiently large that it does not limit the Q-factor of the resonant network, thus minimizing power dissipation in the switch. Also, it is made sufficiently large that during TX mode, when there are large voltages on input/output port 203 of transceiver IC 202, the voltage at LNA 209 input is small so that the voltage does not damage that input. Operating in reception mode, TX series switch 206 is in the off position in order to minimize loss of received signal power in the transmit path for transceiver 200. In addition, RX shunt switch 207 is off. Amplified signals are passed from LNA 209 to receiver 210.

Disadvantages of conventional approaches will be evident to one skilled in the art when presented in the disclosure that follows.

BRIEF DESCRIPTION OF THE SEVERAL VIEWS OF THE DRAWING(S)

DETAILED DESCRIPTION OF THE INVENTION

The technology described herein is directed to an apparatus and methods of operation that are further described in the following Brief Description of the Drawings and the Detailed Description of the Invention. Other features and advantages will become apparent from the following detailed description made with reference to the accompanying drawings.

Figure 1:
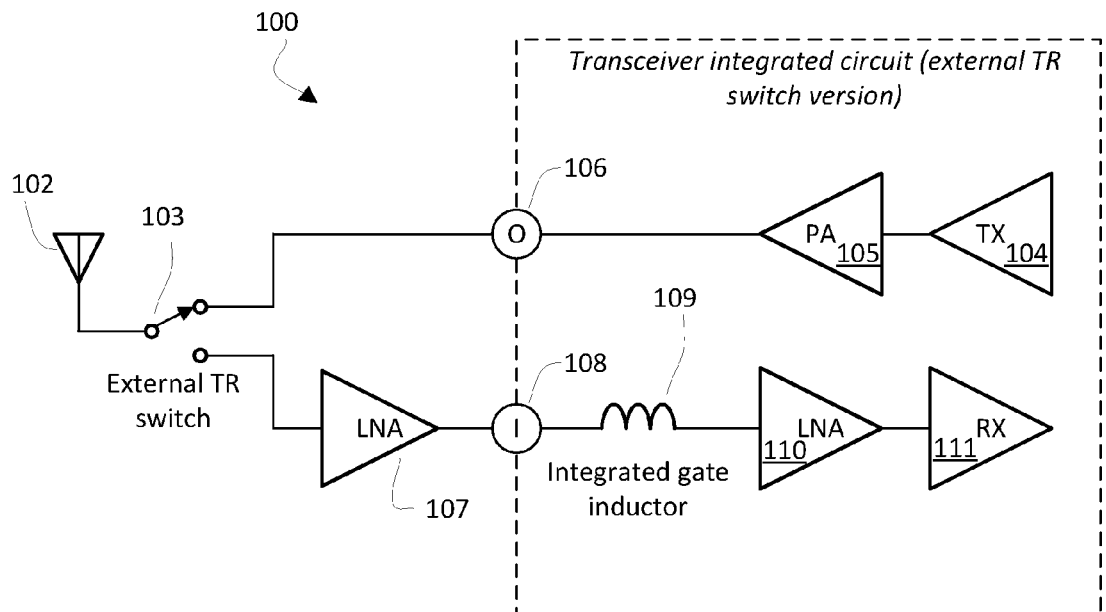
FIG. 1 is a circuit diagram of a transceiver integrated circuit with external TR switch.
Figure 2:
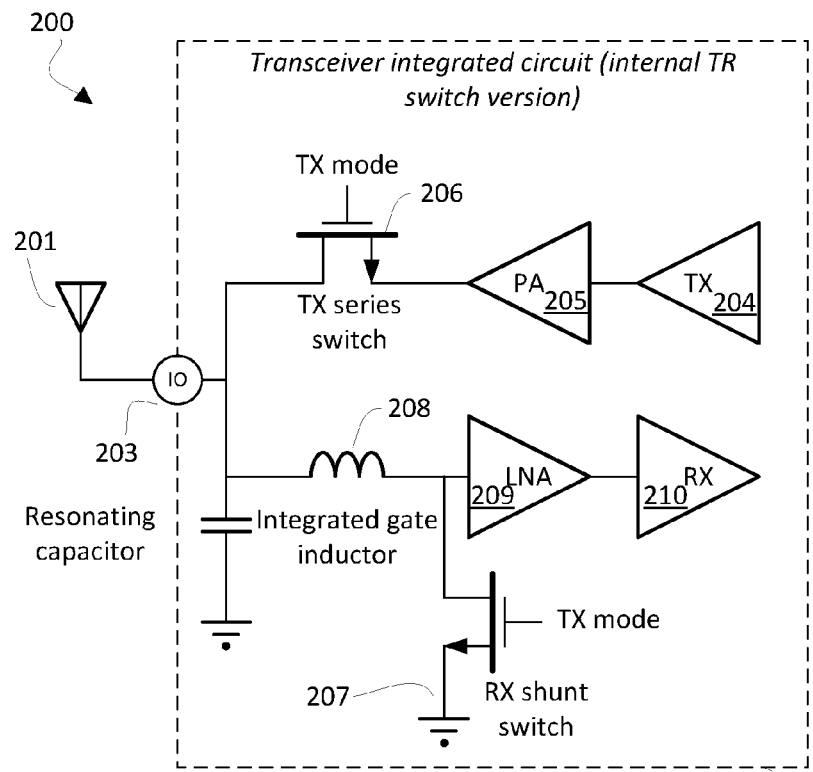
FIG. 2 is a circuit diagram of a transceiver integrated with internal TR switch.
Figure 3:
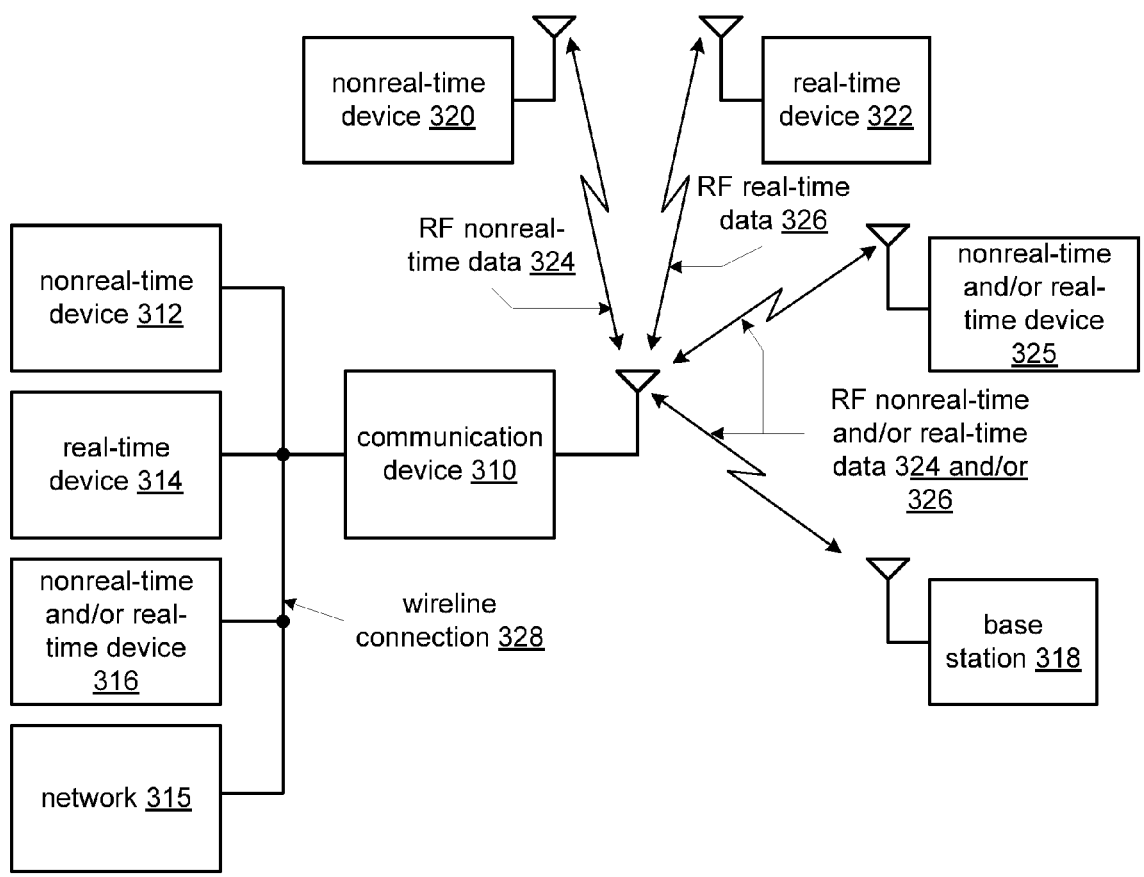
FIG. 3 is a schematic block diagram of an embodiment of a wireless communication embodying the technology described herein.

FIG. 3 is a schematic block diagram of a communication system in accordance with the technology described herein. In particular, a communication system is shown that includes a communication device 310 that communicates real-time data 326 and/or non-real-time data 324 wirelessly with one or more other devices such as base station 318, non-real-time device 320, real-time device 322, and non-real-time and/or real-time device 325. In addition, communication device 310 can also optionally communicate over a wireline connection with network 315, non-real-time device 312, real-time device 314, and non-real-time and/or real-time device 316.

In an embodiment of the technology described herein the wireline connection 328 can be a wired connection that operates in accordance with one or more standard protocols, such as a universal serial bus (USB), Institute of Electrical and Electronics Engineers (IEEE) 488, IEEE 1394 (Firewire), Ethernet, small computer system interface (SCSI), serial or parallel advanced technology attachment (SATA or PATA), or other wired communication protocol, either standard or proprietary. The wireless connection can communicate in accordance with a wireless network protocol such as WiHD, NGMS, IEEE 802.11a, ac, b, g, n, or other 802.11 standard protocol, Bluetooth, Ultra-Wideband (UWB), WIMAX, or other wireless network protocol, a wireless telephony data/ voice protocol such as Global System for Mobile Communications (GSM), General Packet Radio Service (GPRS), Enhanced Data Rates for Global Evolution (EDGE), Personal Communication Services (PCS), or other mobile wireless protocol or other wireless communication protocol, either standard or proprietary. Further, the wireless communication path can include separate transmit and receive paths that use separate carrier frequencies and/or separate frequency channels. Alternatively, a single frequency or frequency channel can be used to bi-directionally communicate data to and from the communication device 310.

Communication device 310 can be a mobile phone such as a cellular telephone, a local area network device, personal area network device or other wireless network device, a personal digital assistant, game console, personal computer, laptop computer, or other device that performs one or more functions that include communication of voice and/or data via wireline connection 328 and/or the wireless communication path. Further communication device 310 can be an access point, base station or other network access device that is coupled to a network 315 such as the Internet or other wide area network, either public or private, via wireline connection 328. In an embodiment of the technology described herein, the real-time and non-real-time devices 312, 314, 316, 318, 320, 322 and 325 can be personal computers, laptops, PDAs, mobile phones, such as cellular telephones, devices equipped with wireless local area network or Bluetooth transceivers, FM tuners, TV tuners, digital cameras, digital camcorders, or other devices that either produce, process or use audio, video signals or other data or communications.

In operation, the communication device includes one or more applications that include voice communications such as standard telephony applications, voice-over-Internet Protocol (VoIP) applications, local gaming, Internet gaming, email, instant messaging, multimedia messaging, web browsing, audio/video recording, audio/video playback, audio/video downloading, playing of streaming audio/video, office applications such as databases, spreadsheets, word processing, presentation creation and processing and other voice and data applications. In conjunction with these applications, the real-time data 326 includes voice, audio, video and multimedia applications including Internet gaming, etc. The non-real-time data 324 includes text messaging, email, web browsing, file uploading and downloading, etc.

In an embodiment of the technology described herein, the communication device 310 includes a wireless transceiver that includes one or more features or functions of the technology described herein. Such wireless transceivers shall be described in greater detail in association with FIGS. 4-9 that follow.

Figure 4:
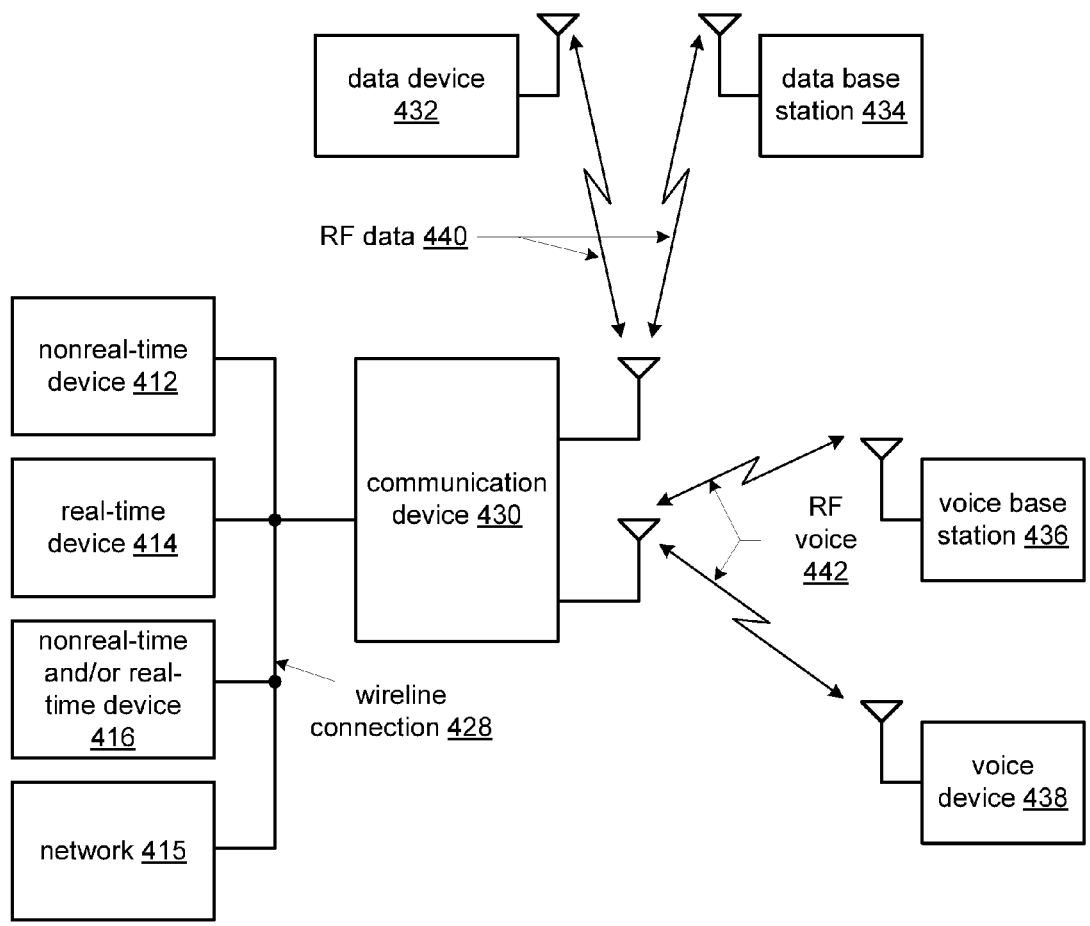
FIG. 4 is a schematic block diagram of another embodiment of a wireless communication system embodying the technology described herein.

FIG. 4 is a schematic block diagram of an embodiment of another communication system in accordance with the technology described herein. In particular, FIG. 4 presents a communication system that includes many common elements of FIG. 3 that are referred to by common reference numerals. Communication device 430 is similar to communication device 310 and is capable of any of the applications, functions and features attributed to communication device 310, as discussed in conjunction with FIG. 3. However, communication device 430 includes two or more separate wireless transceivers for communicating, contemporaneously, via two or more wireless communication protocols with data device 432 and/or data base station 434 via RF data 440 and voice base station 436 and/or voice device 438 via RF voice signals 442.

Figure 5:
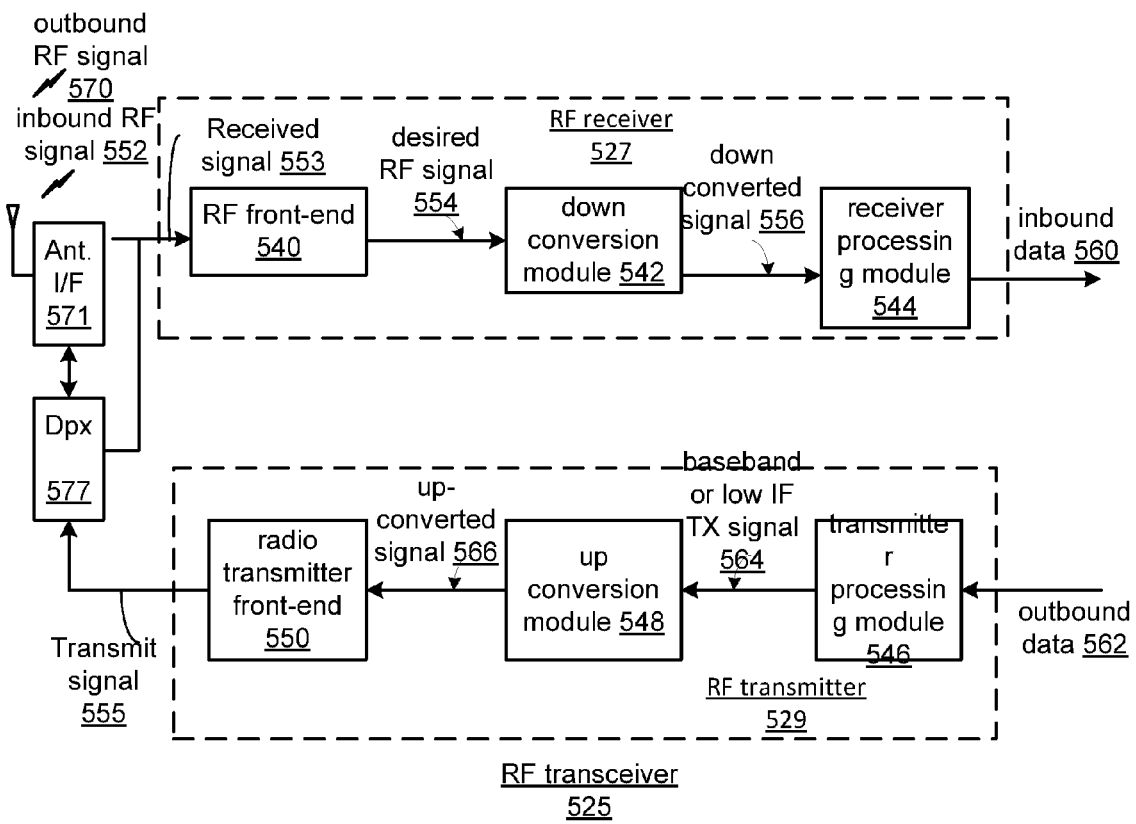
FIG. 5 is a schematic block diagram of an RF transceiver for a wireless communication system embodying the technology described herein.

FIG. 5 is a schematic block diagram of an embodiment of a wireless transceiver 525 in accordance with the technology described herein. The RF transceiver 525 represents a wireless transceiver for use in conjunction with communication devices 310 or 430, base station 318, non-real-time device 320, real-time device 322, and non-real-time, real-time device 325, data device 432 and/or data base station 434, and voice base station 436 and/or voice device 438. RF transceiver 525 includes an RF transmitter 529, and an RF receiver 527. The RF receiver 527 includes a RF front end 540, a down conversion module 542 and a receiver processing module 544. The RF transmitter 529 includes a transmitter processing module 546, an up conversion module 548, and a radio transmitter front-end 550.

Figure 6:
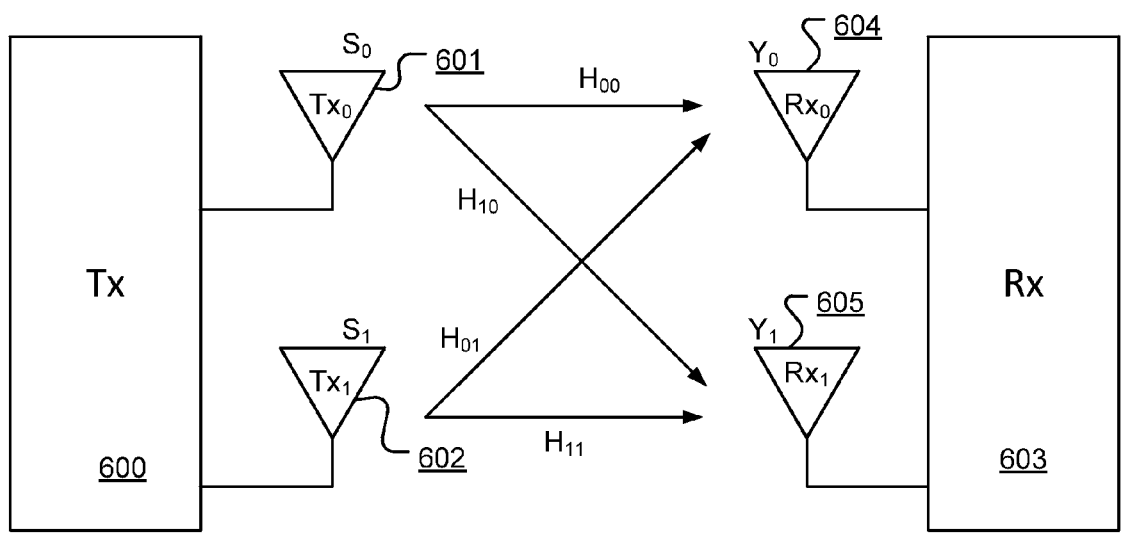
FIG. 6 is a schematic block diagram of a simple two antenna MIMO structure embodying the technology described herein.

As shown, the receiver and transmitter are each coupled to an antenna through an antenna interface 571 and a diplexer (duplexer) 577, that couples the transmit signal 555 to the antenna to produce outbound RF signal 570 and couples inbound signal 552 to produce received signal 553. Alternatively, a transmit/receive switch can be used in place of diplexer 577. While a single antenna is represented in FIG. 5, the receiver and transmitter may share a multiple antenna structure that includes two or more antennas as shown in FIG. 6, discussed in greater detail hereafter.

In operation, the RF transmitter 529 receives outbound data 562. The transmitter processing module 546 packetizes outbound data 562 in accordance with a millimeter wave protocol or wireless telephony protocol, either standard or proprietary, to produce baseband or low intermediate frequency (IF) transmit (TX) signals 564 that includes an outbound symbol stream that contains outbound data 562. The baseband or low IF TX signals 564 may be digital baseband signals (e.g., have a zero IF) or digital low IF signals, where the low IF typically will be in a frequency range of one hundred kilohertz to a few megahertz. Note that the processing performed by the transmitter processing module 546 can include, but is not limited to, scrambling, encoding, puncturing, mapping, modulation, and/or digital baseband to IF conversion.

The up conversion module 548 includes a digital-to-analog conversion (DAC) module, a filtering and/or gain module, and a mixing section. The DAC module converts the baseband or low IF TX signals 564 from the digital domain to the analog domain. The filtering and/or gain module filters and/or adjusts the gain of the analog signals prior to providing it to the mixing section. The mixing section converts the analog baseband or low IF signals into up-converted signals 566 based on a transmitter local oscillation.

The radio transmitter front end 550 includes a power amplifier and may also include a transmit filter module. The power amplifier amplifies the up-converted signals 566 to produce outbound RF signals 570, which may be filtered by the transmitter filter module, if included. The antenna structure transmits the outbound RF signals 570 via an antenna interface 571 coupled to an antenna that provides impedance matching and optional band pass filtration.

The RF receiver 527 receives inbound RF signals 552 via the antenna and antenna interface 571 that operates to process the inbound RF signal 552 into received signal 553 for the receiver front-end 540. In general, antenna interface 571 provides impedance matching of antenna to the RF front-end 540, optional band pass filtration of the inbound RF signal 552.

The down conversion module 542 includes a mixing section, an analog to digital conversion (ADC) module, and may also include a filtering and/or gain module. The mixing section converts the desired RF signal 554 into a down converted signal 556 that is based on a receiver local oscillation, such as an analog baseband or low IF signal. The ADC module converts the analog baseband or low IF signal into a digital baseband or low IF signal. The filtering and/or gain module high pass and/or low pass filters the digital baseband or low IF signal to produce a baseband or low IF signal that includes an inbound symbol stream. Note that the ordering of the ADC module and filtering and/or gain module may be switched, such that the filtering and/or gain module is an analog module.

The receiver processing module 544 processes the baseband or low IF signal in accordance with a millimeter wave protocol, either standard or proprietary, to produce inbound data 560 such as probe data received from a probe device or devices (not shown). The processing performed by the receiver processing module 544 can include, but is not limited to, digital intermediate frequency to baseband conversion, demodulation, demapping, depuncturing, decoding, and/or descrambling.

In an embodiment of the technology described herein, receiver processing module 544 and transmitter processing module 546 can be implemented via use of a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices that are either on-chip or off-chip. Such a memory device may be a read-only memory, random access memory, volatile memory, non-volatile memory, static memory, dynamic memory, flash memory, and/or any device that stores digital information. Note that when the processing devices implement one or more of their functions via a state machine, analog circuitry, digital circuitry, and/or logic circuitry, the associated memory storing the corresponding operational instructions for this circuitry is embedded with the circuitry comprising the state machine, analog circuitry, digital circuitry, and/or logic circuitry.

While the processing module 544 and transmitter processing module 546 are shown separately, it should be understood that these elements could be implemented separately, together through the operation of one or more shared processing devices or in combination of separate and shared processing.

In another embodiment, the receiver and transmitter may share a multiple input multiple output (MIMO) antenna structure, diversity antenna structure, phased array or other controllable antenna structure that includes a plurality of antennas and other RF transceivers similar to RF transceiver 525.

Each of these antennas may be fixed, programmable, an antenna array or other antenna configuration. Also, the antenna structure of the wireless transceiver may depend on the particular standard(s) to which the wireless transceiver is compliant and the applications thereof.

FIG. 6 illustrates a simple two antenna MIMO structure. A transmitting (TX) unit 600 is shown having two antennas 601, 602, while a receiving (RX) unit 603 is shown having two antennas 604 and 605. It is to be noted that both transmitting unit 600 and receiving unit 603 are generally both transceivers, but are shown as a separate transmitter (TX) and receiver (RX) units for an exemplary purpose in FIG. 6. That is, TX unit 600 is transmitting data and RX unit 603 is receiving the transmitted data. The transmitted data symbols at antennas 601 ($TX_0$), 602 ($TX_1$) are noted as $S_0$ and $S_1$, respectively. The received data symbols at antennas 604 ($RX_0$), 605 ($RX_1$) are noted as $Y_0$ and $Y_1$ respectively. Since the example illustrates a two transmit antenna/two receive antenna MIMO system, the four resulting RF signal paths are noted as $H_{00}$, $H_{01}$, $H_{10}$, and $H_{11}$ (using the $H_{TX-RX}$ notation) and the data path is referred to as channel H. While, the example illustrated is a two antenna structure, the embodiments disclosed herein may operate within other known antenna configurations (e.g., 2×4, 2×8, 4×16, etc.).

The technology described herein in various embodiments provides an external high-Q matching network, including for example, a discrete input (gate) inductor for the IC receiver first stage LNA, as opposed to an integrated gate inductor. Integrated inductors have significantly lower Q factors than discrete inductors. As a result, they dissipate extra RF power.

Firstly, for the receiver's LNA, typical integrated gate inductors increase noise and thus lower the sensitivity. Thus, using an external inductor improves receiver performance. Secondly, for internal TR switch chips, the LNA gate inductor is important to provide a high-Q resonant load in order to minimize transmit power dissipated in the receive path. Thus, using a higher Q external discrete inductor increases transmit power. Thirdly, using an external LNA gate inductor means the transmitter output of the chip has a separate pin to the receiver input. It is thus possible to configure the same chip to use an internal TR switch, or external TR switch by changing connections at the board level rather than the chip level. This greatly reduces mask and design effort. In addition, having the flexibility to modify the gate inductance after IC fabrication means the input match can be tuned based on measurements. This in turn can reduce costs due to design modifications due to incorrect tuning that often arise from the difficulty of accurately calculating all on-chip parasitics, because a redesign of the chip with a different sized integrated inductor is not required.

Figure 7:
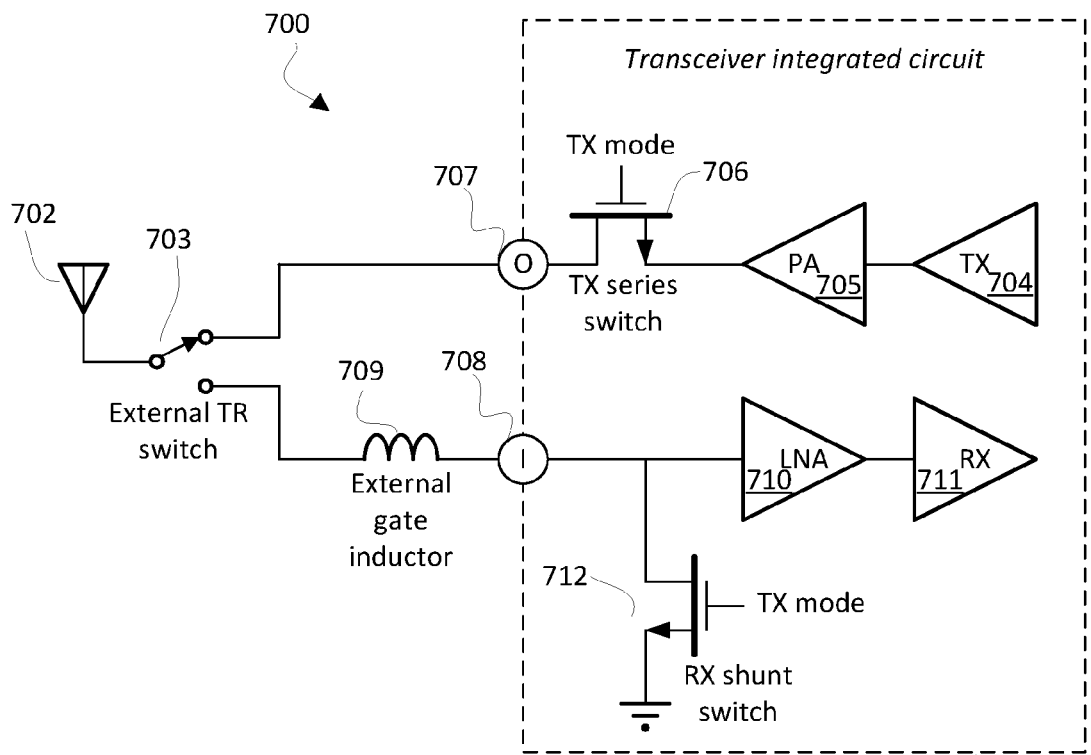
FIG. 7 is an embodiment of the technology described herein illustrating a circuit diagram of a transceiver integrated circuit with external LNA gate inductor, configured with an external TR switch.
Figure 8:
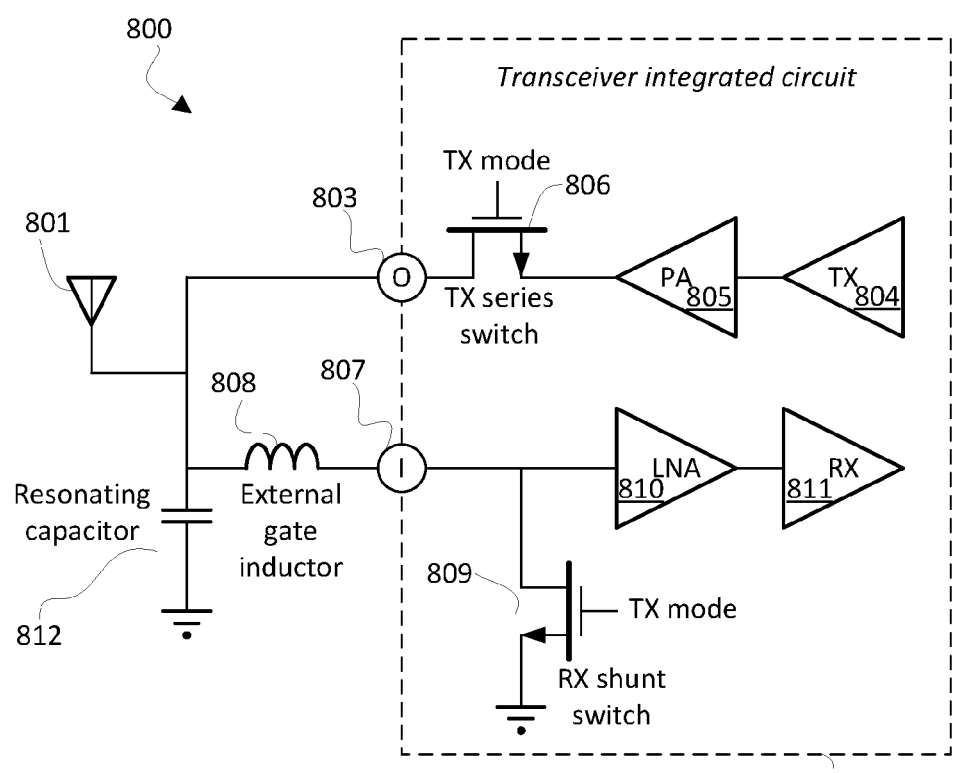
FIG. 8 is an embodiment of the technology described herein illustrating a circuit diagram of a transceiver integrated circuit with external LNA gate inductor, configured with an internal TR switch.

Example embodiments of a transceiver integrated circuit with external LNA gate inductor, configured with an external TR switch and with an internal TR switch, are provided in FIG. 7 and FIG. 8, respectively. Transmitter and receiver signal paths for an integrated circuit (IC) (chip) as well as circuitry/components external to the IC are described in conjunction with FIGS. 7-9. The same chip can be configured for these two modes of operation by simple board modification as described hereafter.

FIG. 7 illustrates an example embodiment of the present technology described herein for an externally switched transceiver with external (to the transceiver integrated circuit) high-Q matching network, including for example an input (gate) inductor. Transceiver 700 includes transceiver IC 701 that passes communication signals to be transmitted via transmitter 704 in connection with power amplifier (PA) 705 through TX series switch 706 (ON in transmit mode) and output port 707. External TR switch 703, in transmission mode, provides a connection between output port 707 and antenna 702 for communication signal transmission. During reception mode, communication signals are received through antenna 702 passing through external switch 703 (with RX selected), through an external high-Q matching network, including for example, external LNA input (gate) inductor 709, to transceiver IC 701 via input port 708. Received communication signals pass from input port 708 through LNA 710 to receiver 711. Circuitry designed to protect the LNA input during transmission mode in internal TR switch configuration, for example, RX shunt switch 712, is OFF.

When configured with an external TR switch, as illustrated in FIG. 7, the integrated TX series switch 706 and RX shunt switch 712 have decreased importance to the transceiver's operation. They are designed to have minimal impact on transmit and receive performance in this configuration. For example, the TX series switch, in one embodiment, has a large gate width with small gate length in order to minimize its series resistance and shunt capacitance. The RX shunt switch is designed in one embodiment, with reduced shunt parasitics which do not affect the internal LNA's noise (using known methods in the art).

FIG. 8 illustrates one embodiment of many possible implementations for an external high-Q matching network. In this embodiment, an external LNA input (gate) inductor is configured with internal TR switches. In transmission mode, transceiver 800 sends communication signals from transmitter 804 to PA 805. The amplified communication signals pass through TX series switch (ON) 806 through output port 803 and are transmitted through antenna 801. In addition, a switched (ON) parallel resonant circuit, including for example, a receiver (RX) shunt switch 809, presents a high impedance load to the TX series switch 806. External LNA input (gate) inductor 808 resonates with the shunt capacitance in order that the receive path presents a high impedance to transmitter 804, thus minimizing power loss in that path. The size of RX shunt switch 809 is made sufficiently large that it does not limit the Q-factor of the resonant network, thus minimizing power dissipation in the switch. In one embodiment, it is made sufficiently large that during TX mode, when there are large voltages on output port 803 of transceiver IC 802, the voltage at LNA 810 input is small so that the voltage does not damage that input.

Operating in reception mode, TX series switch 806 is in the OFF position in order to minimize loss of received signal power in the transmit path for transceiver 800. The switch for the parallel resonant circuit, for example, receiver (RX) shunt switch 809, is also OFF. In reception mode, signals are received from antenna 801 passing through external LNA gate inductor 808 into transceiver 802 via input port 807 to LNA 810 and receiver 811.

The resonating capacitance 812 in FIG. 8 may be either integrated at the output port of the IC, or external. It is sized to maintain a good input match in RX mode, and to resonate with the gate inductor in TX mode at the frequency of operation such that power loss in the receive path is minimized. A further advantage of using external gate inductor and resonating capacitor is that it can be tuned after IC fabrication to account for parasitics on the IC that were not accurately determined before the IC was fabricated.

Figure 9:
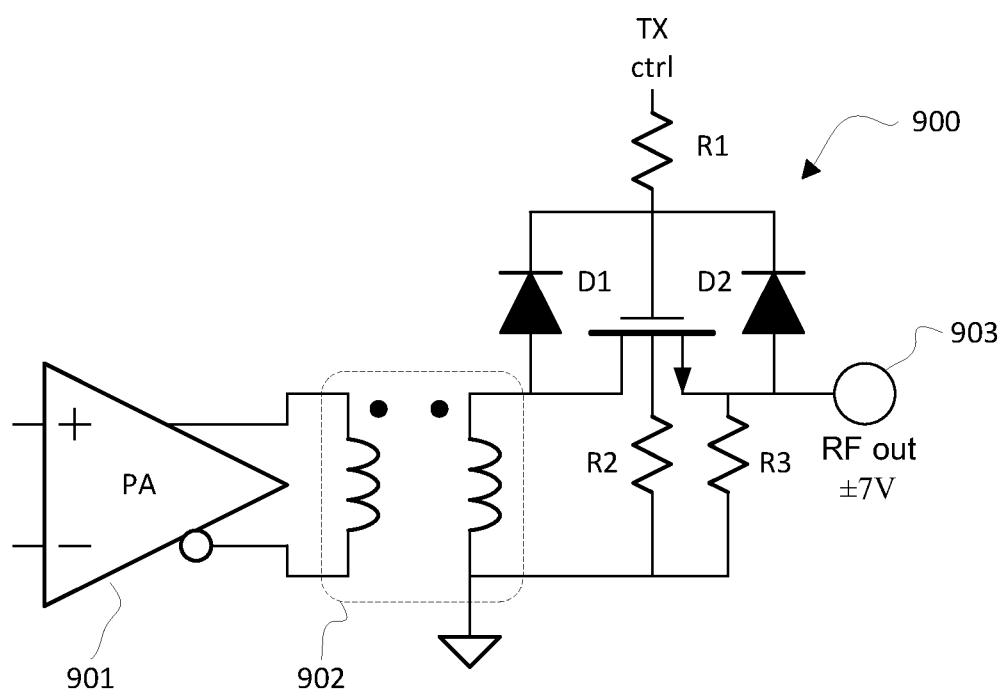
FIG. 9 is an embodiment of the technology described herein illustrating a circuit diagram of a TR switch electrostatic discharge (ESD) protection.

In one embodiment, the LNA input port is protected for ESD events using shunt diodes in a standard configuration. However, the TX port needs special consideration—it cannot use shunt diodes directly because the voltage swing during transmission is very large. The TX series switch can be damaged for ESD events on the output port. In one embodiment, the switch uses a protection scheme as shown in the circuit of FIG. 9. PA 901 is connected to protection switch 900 through transformer 902. Diodes D1 and D2 are added to TX series switch 900, and are placed in one or more deep-n wells so they can sustain large swings. For a positive ESD event, the voltage at the RF output port 903 is raised and D2 turns ON. This pulls the TX series switch 900 gate voltage up, turning the switch ON, allowing it to conduct the ESD current through to a balun. During a negative ESD event, the switch 900 gate voltage drops due to capacitive coupling from RF out 903. D1 then turns ON and pulls the gate voltage up relative to the RF out port 903, turning the switch ON to enable it to conduct the ESD current.

The technology described herein can be represented by a single chip device providing the highest level of integration for a mobile or handheld wireless system, with integrated IEEE 802.11 a/b/g and single-stream 802.11 n (MAC/baseband/radio), Bluetooth 4.0+HS, and FM radio receiver and transmitter. It may include on-chip 2.4 GHz and 5 GHz WLAN power amplifiers that meet the output power requirements for most handheld systems while permitting and an optional external power amplifier for higher output power applications, if required. Additionally, multiple transmitters may be connected to the same node, each with its own TX series switch (for example, WLAN and Bluetooth transmitters).

It is understood that there are numerous ways transmit/receive switching can be implemented. The technology described herein is not intended to be limited to the example embodiments described.

The various embodiments described herein can be fully implemented in, but not limited to: an RF transceiver, user equipment (UE) transceiver, base station (BS) transceiver, wireless transceiver, LTE transceiver or MIMO transceiver.

As may be used herein, the term "external" refers to any structure or component not located within the same transceiver IC (chip). These external components are, in various embodiments, located on the same circuit board, other ICs, chips, or separate circuit boards. It is envisioned, in some embodiments, that "external" components would be co-located on the same IC with protective electrical/noise isolation between co-located transceiver and external components. The terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operatively connected", "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items.

As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship.

As may also be used herein, the terms "processing module", "processing circuit", and/or "processing unit" may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry includes the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the figures. Such a memory device or memory element can be included in an article of manufacture.

The technology as described herein has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed technology described herein. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed technology described herein. One of average skill in the art will also recognize that the functional building blocks, and other illustrative blocks, modules and components herein, can be implemented as illustrated or by discrete components, application specific integrated circuits, processors executing appropriate software and the like or any combination thereof.

The technology as described herein may have also been described, at least in part, in terms of one or more embodiments. An embodiment of the technology as described herein is used herein to illustrate an aspect thereof, a feature thereof, a concept thereof, and/or an example thereof. A physical embodiment of an apparatus, an article of manufacture, a machine, and/or of a process that embodies the technology described herein may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as CMOS, as one of ordinary skill in the art will appreciate, the transistors may be implemented using any type of transistor structure including, but not limited to, bipolar, field effect (FET) or metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

While particular combinations of various functions and features of the technology as described herein have been expressly described herein, other combinations of these features and functions are likewise possible. The technology as described herein is not limited by the particular examples disclosed herein and expressly incorporates these other combinations.

What is claimed is:

1. A wireless communications transceiver, comprising:
   a transceiver integrated circuit comprising a transmitter with transmitter signal path and a receiver with receiver signal path;
   an antenna, external to the transceiver integrated circuit, selectively connected in a transmission mode to the transmitter signal path and in reception mode to the receiver signal path, the antenna selectively connected, in the transmission mode, to the transmitter signal path by a series switch (ON) located within the transceiver integrated circuit in the transmitter signal path and isolated from the receiver signal path by at least a switched (ON) parallel resonant circuit that presents a high impedance load to the transmitter, and in the reception mode, both the series switch and the switch for the parallel resonant circuit are (OFF) to prevent signal loss, the series switch including electrostatic discharge (ESD) protection circuitry comprising a plurality of diodes connected between a gate and drain, and gate and source, of the series switch; and
   a high-Q matching network, comprising one or more elements external to the transceiver integrated circuit and connected between the antenna and the receiver signal path, the one or more elements comprising at least an external LNA input inductor resonating with a capacitance of the parallel resonant circuit at a transmission frequency of interest so that minimal transmit power is dissipated in the receiver signal path.

2. A wireless communications transceiver, as per claim 1, wherein the receiver signal path further comprises an LNA and the high-Q matching network connects to an input of the LNA through an input port of the transceiver integrated circuit.

3. A wireless communications transceiver, as per claim 2, wherein the external LNA input inductor of the high-Q matching network comprises an external high-Q discrete inductor.

4. A wireless communications transceiver, as per claim 1, wherein the antenna, external to the transceiver integrated circuit, is selectively connected to the transmitter or receiver signal path by an external transmit/receive (TR) switch.

5. A wireless communications transceiver, as per claim 1, wherein the plurality of diodes are placed in one or more deep-n wells.

6. A wireless communications transceiver, as per claim 1, wherein the transmitter signal path further comprises at least a power amplifier (PA) connected to an output of the transmitter.

7. A wireless communications transceiver, as per claim 1, wherein the high-Q matching network comprises a resonating capacitor coupled to the external LNA input inductor.

8. A wireless communications transceiver, as per claim 1, wherein the transceiver is part of an RF transceiver, user equipment (UE) transceiver, base station (BS) transceiver, wireless transceiver, LTE transceiver or MIMO transceiver.

9. A system comprising a communications transceiver, comprising:
   a transceiver integrated circuit comprising a transmitter with transmitter signal path and a receiver with receiver signal path;
   an antenna, external to the transceiver integrated circuit, selectively connected in a transmission mode to the transmitter signal path and in reception mode to the receiver signal path, the antenna selectively connected, in the transmission mode, to the transmitter signal path by a series switch (ON) located within the transceiver integrated circuit in the transmitter signal path and isolated from the receiver signal path by at least a switched (ON) parallel resonant circuit that presents a high impedance load to the transmitter, and in the reception mode, both the series switch and the switch for the parallel resonant circuit are (OFF) to prevent signal loss, the series switch including electrostatic discharge (ESD) protection circuitry comprising a plurality of diodes connected between a gate and drain, and gate and source, of the series switch; and
   a high-Q matching network, comprising one or more elements external to the transceiver integrated circuit and connected between the antenna and the receiver signal path, the one or more elements comprising at least an external LNA input inductor resonating with a capacitance of the parallel resonant circuit at a transmission frequency of interest so that minimal transmit power is dissipated in the receiver signal path.

10. A system comprising a communications transceiver, as per claim 9, wherein the receiver signal path further comprises an LNA and the high-Q matching network connects to an input of the LNA through an input port of the transceiver integrated circuit.

11. A system comprising a communications transceiver, as per claim 10, wherein the external LNA input inductor of the high-Q matching network comprises an external high-Q discrete inductor.

12. A system comprising a communications transceiver, as per claim 9, wherein the antenna, external to the transceiver integrated circuit, is selectively connected to the transmitter or receiver signal path by an external transmit/receive (TR) switch.

13. A system comprising a communications transceiver, as per claim 9, wherein the diodes are placed in one or more deep-n wells.

14. A communications transceiver, comprising:
  a transceiver integrated circuit comprising a transmitter signal path comprising at least a transmitter, power amplifier, series switch and output port and a receiver signal path comprising at least a receiver, low-noise amplifier and switched parallel resonant circuit, the series switch including electrostatic discharge (ESD) protection circuitry comprising a plurality of diodes connected between a gate and drain, and gate and source, of the series switch;
  an antenna, external to the transceiver integrated circuit, selectively connected in a transmission mode to the transmitter signal path and in reception mode to the receiver signal path; and
  a high-Q matching network, comprising one or more elements external to the transceiver integrated circuit and connected between the antenna and the receiver signal path, the one or more elements comprising at least an external LNA input inductor resonating with a capacitance of the switched parallel resonant circuit at a transmission frequency of interest providing a high impedance load to the transmitter so that minimal transmit power is dissipated in the receiver signal path.

15. A communications transceiver, as per claim 14, wherein the external LNA input inductor of the high-Q matching network comprises an external high-Q discrete inductor.

16. A communications transceiver, as per claim 14, wherein the antenna, external to the transceiver integrated circuit, is selectively connected to the transmitter or receiver signal path by an external transmit/receive (TR) switch.

17. A communications transceiver, as per claim 14, wherein the antenna is selectively connected, in the transmission mode, to the transmitter signal path by the series switch (ON) and is isolated from the receiver signal path by at least the switched parallel resonant circuit (ON) that presents a high impedance load to the transmitter, and in the reception mode, both the series switch and the switch for the parallel resonant circuit are (OFF) to prevent signal loss.

18. A communications transceiver, as per claim 14, wherein the high-Q matching network comprises a resonating capacitor coupled to the external LNA input inductor.

19. A communications transceiver, as per claim 14, wherein the diodes are placed in one or more deep-n wells.

20. A communications transceiver, as per claim 14, wherein the communications transceiver is part of an RF transceiver, user equipment (UE) transceiver, base station (BS) transceiver, wireless transceiver, LTE transceiver or MIMO transceiver.

\* \* \* \* \*